(12) United States Patent
Yamada et al.

(10) Patent No.: US 9,728,904 B2
(45) Date of Patent: Aug. 8, 2017

(54) METHOD FOR CONNECTING DIFFERENTIAL TRANSMISSION CABLE, DIFFERENTIAL TRANSMISSION CABLE AND ELECTRIC DEVICE

(71) Applicant: NIHON I/F K.K., Tokyo (JP)

(72) Inventors: Akiyoshi Yamada, Koga (JP); Masami Maruyama, Tokyo (JP); Shinzo Sakamoto, Tokyo (JP)

(73) Assignee: NIHON I/F K.K., Tokyo (JP)

( * ) Notice: Subject to any disclaimer, the term of this patent is extended or adjusted under 35 U.S.C. 154(b) by 0 days.

(21) Appl. No.: 14/651,183

(22) PCT Filed: Nov. 22, 2013

(86) PCT No.: PCT/JP2013/081564
§ 371 (c)(1),
(2) Date: Jun. 10, 2015

(87) PCT Pub. No.: WO2014/091907
PCT Pub. Date: Jun. 19, 2014

(65) Prior Publication Data
US 2015/0333450 A1   Nov. 19, 2015

(30) Foreign Application Priority Data
Nov. 22, 2013 (JP) ................ 2013/081564

(51) Int. Cl.
*H04B 3/28* (2006.01)
*H01R 13/6592* (2011.01)
(Continued)

(52) U.S. Cl.
CPC ......... *H01R 13/6592* (2013.01); *H01B 11/12* (2013.01); *H01B 11/1891* (2013.01);
(Continued)

(58) Field of Classification Search
USPC ............................................. 174/78
See application file for complete search history.

(56) References Cited

U.S. PATENT DOCUMENTS 3,142,721 A * 7/1964 Long ............ H01R 9/05
174/151
3,551,882 A * 12/1970 O'Keefe ......... H01R 24/40
174/75 C
(Continued)

FOREIGN PATENT DOCUMENTS

JP  58-204417 A  11/1983
JP  S58-204417 A  11/1983
(Continued)

OTHER PUBLICATIONS

English Translation of the International Preliminary Report on Patentability in PCT Application No. PCT/JP2013/081564 dated Jun. 25, 2015.
(Continued)

*Primary Examiner* — William H Mayo, III
*Assistant Examiner* — Krystal Robinson
(74) *Attorney, Agent, or Firm* — Sand & Sebolt

(57) ABSTRACT

A method for connecting a differential transmission cable, (and a differential transmission cable and an electric device) includes: connecting a pair of conductors for transmitting a differential signal to transceivers; and connecting a second shield provided on the periphery of a first shield via an insulating layer to frame grounds, without electrically connecting anywhere the first shield that is provided on the periphery of the pair of conductors via a dielectric layer.

18 Claims, 12 Drawing Sheets

(51) Int. Cl.
*H01B 11/12* (2006.01)
*H01B 11/18* (2006.01)
*H01B 13/016* (2006.01)
*H01B 11/20* (2006.01)

(52) U.S. Cl.
CPC ............ *H01B 13/016* (2013.01); *H04B 3/28* (2013.01); *H01B 11/20* (2013.01); *Y10T 29/49124* (2015.01)

(56) References Cited

U.S. PATENT DOCUMENTS

| | | | | |
|---|---|---|---|---|
| 3,598,895 | A * | 8/1971 | Garland | H01R 9/05 174/359 |
| 6,010,788 | A * | 1/2000 | Kebabjian | H01B 11/002 174/102 R |
| 6,226,330 | B1 * | 5/2001 | Mansur | H04B 3/00 375/257 |
| 6,403,887 | B1 | 6/2002 | Kebabjian et al. | |
| 2002/0126457 | A1 * | 9/2002 | Kameyama | H01R 13/6658 361/728 |
| 2003/0070831 | A1 * | 4/2003 | Hudson | H01B 7/295 174/113 R |
| 2006/0048966 | A1 * | 3/2006 | Takahashi | H01B 11/1025 174/108 |
| 2007/0275605 | A1 * | 11/2007 | Hubbard | H01R 12/721 439/660 |
| 2010/0025072 | A1 * | 2/2010 | Okano | H01B 11/1008 174/115 |
| 2011/0100682 | A1 | 5/2011 | Nonen et al. | |
| 2011/0232941 | A1 | 9/2011 | Sugiyama et al. | |
| 2011/0278043 | A1 | 11/2011 | Ueda et al. | |

FOREIGN PATENT DOCUMENTS

| | | |
|---|---|---|
| JP | 2001-035270 A | 2/2001 |
| JP | 2004-119060 A | 4/2004 |
| JP | 2008-181818 A | 8/2008 |
| JP | 2011-096574 A | 5/2011 |
| JP | 2011-198677 A | 10/2011 |
| JP | 2012-074901 A | 4/2012 |
| JP | 2012-238468 A | 12/2012 |
| WO | WO 2010/092812 A1 | 8/2010 |

OTHER PUBLICATIONS

International Search Report (ISR) (PCT Form PCT/ISA/210), in PCT/JP2013/081564, dated Dec. 17, 2013.
Olisar, Ron. "Unbalanced Twisted Pairs Can Give You the Jitters!" Maxim Engineering Journal 64 (2008): 3-12.

* cited by examiner

METHOD FOR CONNECTING DIFFERENTIAL TRANSMISSION CABLE, DIFFERENTIAL TRANSMISSION CABLE AND ELECTRIC DEVICE

TECHNICAL FIELD

The invention relates to a method for connecting a differential transmission cable transmitting a differential signal, a differential transmission cable and an electric device.

BACKGROUND ART

LVDS (Low Voltage Differential Signaling), specified in 1995 as a standard for a short-range digital communications, is widely applied to interfaces which transmit differential signals. Differential signal transmission by LVDS is characterized by low power consumption, excellent noise immunity and little electromagnetic radiation.

The maximum transmission rate specified for LVDS was conventionally 3.125 Gbps in view of performance of differential transmission cables and semiconductor elements. Now, improvement in performance of semiconductor elements due to miniaturization, etc., allows transmission signal to be output at not less than 28 Gbps and a differential transmission cable with metal capable of differential signal transmission of not less than 28 Gbps has been put to practical use. The transmission range of this differential transmission cable is limited to a very short range.

Meanwhile, since differential signals transmitted through differential transmission cables are also required to exhibit a quality transmission waveform, signal conditioning techniques for differential transmission has been also significantly improved. For example, loss of −40 dB in differential signal of 1.65 Gbps can be compensated by, e.g., an equalizer (EQ) or clock and data recovery (CDR) (e.g., MAX3815 is commercially available from Maxim Integrated Products, Inc.).

Use of equalizer or clock and data recovery for differential signals allows intersymbol interference (ISI) of differential signal to be compensated, thereby solving a problem of inter-pair skew in differential signals (a difference in signal propagation time between plural pairs of conductors). However, the problem of intra-pair skew (a difference in signal propagation time between a pair of conductors) has not been solved yet. Thus, the transmission range limit and transmission rate limit of differential signal depend on intra-pair skew of differential transmission cable.

In addition, along with a sharp increase in communication traffic and improvement in semiconductor technology allowing its implementation, differential transmission cables are required to have a further increased transmission rate. For this, it is desired to reduce intra-pair skew of differential transmission cable.

As a conventional differential transmission cable with reduced intra-pair skew, a low-skew parallel coaxial cable has been proposed in which one or more pairs of inner conductors extending in parallel are covered all together with a foamed insulation having a circular or oval cross section, an outer conductor is provided around the foamed insulation, and the outer conductor together with the foamed insulation is covered with an insulating jacket without any gaps (see, e.g., PTL 1).

Meanwhile, a differential signal transmission cable has been proposed in which a pair of conductors arranged in parallel is covered with a flat insulation having flat portions which face each other in a direction orthogonal to an arrangement direction of the pair of conductors so that the pair of conductors is sandwiched therebetween, a shield conductor formed of a metal foil tape is wound around the outer periphery of the insulation, a drain wire is placed longitudinally so as to be in contact with the shield conductor at the position of the flat portions, and the drain wire and the shield conductor are covered with a jacket. In this configuration, electromagnetic coupling between the conductors is increased by reducing a distance between the conductors and common-mode impedance is thereby increased (see, e.g., PTL 2).

CITATION LIST

Patent Literature

[PTL 1]
JP-A-2001-35270
[PTL 2]
JP-A-2011-96574

SUMMARY OF INVENTION

Technical Problem

In the low-skew parallel coaxial cable disclosed in PTL 1, however, effective dielectric constants of the pair of inner conductors become asymmetrical due to dimensional accuracy of the foamed insulation or uneven foaming and intra-pair skew is thus introduced. In addition, extrusion-molding pressure to cover the insulation needs to be precisely controlled in order to maintain a distance between the pair of inner conductors. However, since it is difficult to control the molding pressure, the distance between the pair of inner conductors varies and, in principle, there is a limit on reducing intra-pair skew of the low-skew parallel coaxial cable.

In the differential signal transmission cable disclosed in PTL 2, conversion from differential signals into common-mode signals is decreased by reducing the distance between the conductors and intra-skew is thereby reduced, but a problem of a decrease in differential impedance occurs at the same time. Furthermore, if a size of the conductor is reduced to suppress a decrease in differential impedance, transmission loss of differential signal increases due to resistance in the conductor or the skin effect.

Thus, it is an object of the invention to provide a method for connecting a differential transmission cable, a differential transmission cable and an electric device that allow a reduction in intra-pair skew without increasing the transmission loss of a differential signal.

Solution to Problem

A method for connecting a differential transmission cable, a differential transmission cable and an electric device defined as below are provided according to one embodiment of the invention.

[1] A method for connecting a differential transmission cable, comprising:
    connecting a pair of conductors for transmitting a differential signal to a first contact point; and
    connecting a second shield, provided on a periphery of a first shield via an insulating layer, to a second contact point in a state that the first shield provided on a periphery of the pair of conductors via a dielectric layer is not electrically connected to anywhere.

[2] A method for connecting a differential transmission cable, comprising:
connecting a pair of conductors for transmitting a differential signal to a first contact point; and
connecting a second shield, provided on a periphery of a first shield via an insulating layer, to second contact points in a state that the first shield provided on the periphery of the pair of conductors via a dielectric layer and a drain wire in contact with the first shield are not electrically connected to anywhere.

[3] A differential transmission cable, comprising:
a pair of conductors for transmitting a differential signal;
a first shield that is provided on a periphery of the pair of conductors via a dielectric layer and is not electrically connected to anywhere; and
a second shield provided on a periphery of the first shield via an insulating layer,
wherein common-mode impedance is controlled by selecting a material or a thickness of the insulating layer provided between the first shield and the second shield.

[4] A differential transmission cable, comprising:
a cable main body comprising a pair of conductors for transmitting a differential signal, a first shield provided on a periphery of the pair of conductors via a dielectric layer, and a second shield provided on a periphery of the first shield via an insulating layer; and
a connector that comprises a signal terminal connected to the pair of conductors and a ground terminal connected to the second shield, and that is provided on at least one end portion of the cable main body such that the first shield is not electrically connected to anywhere.

[5] A differential transmission cable, comprising:
a cable main body comprising a pair of conductors for transmitting a differential signal, a first shield provided on a periphery of the pair of conductors via a dielectric layer, a drain wire in contact with the first shield, and a second shield provided on a periphery of the first shield via an insulating layer; and
a connector that comprises a signal terminal connected to the pair of conductors and a ground terminal connected to the second shield, and that is provided on at least one end portion of the cable main body such that the first shield and the drain wire are not electrically connected to anywhere.

[6] An electric device, comprising the differential transmission cable according to any one of [3] to [5].

Advantageous Effects of Invention

According to the invention, the intra-pair skew can be reduced without increasing the transmission loss of a differential signal.

DESCRIPTION OF EMBODIMENTS

Figure 1:
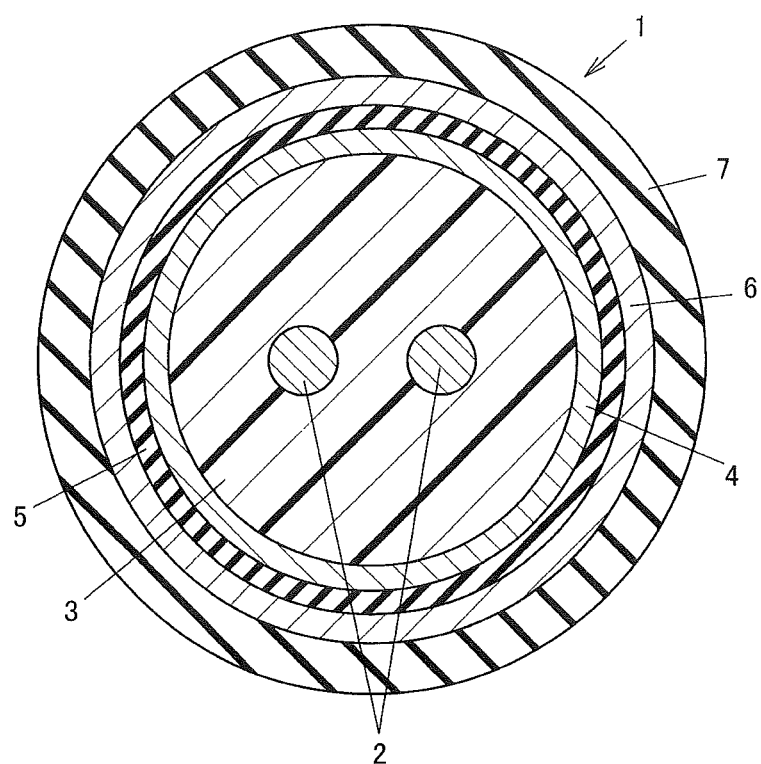
FIG. 1 is a cross sectional view showing a differential transmission cable in a first embodiment of the present invention.

Embodiments of the invention will be described below in reference to the drawings. In the drawings, constituent elements having substantially the same functions are denoted by the same reference numerals and the overlapping explanation thereof will be omitted.

First Embodiment

FIG. 1 is a cross sectional view showing a differential transmission cable in the first embodiment of the invention. A differential transmission cable 1 is provided with a pair of conductors 2 for transmitting differentials signals, a dielectric body 3 covering the pair of conductors 2, a first shield 4 wound around the dielectric body 3 and provided around the outer periphery of the conductors 2 via the dielectric layer, an insulating layer 5 having a predetermined thickness and wound around the outer periphery of the first shield 4, a second shield 6 provided on the outer periphery of the insulating layer 5, and a jacket 7 covering around the outer periphery of these components.

For transmitting differential signals, the pair of conductors 2 of the differential transmission cable 1 are arranged in parallel in a state that the distance therebetween is maintained at, e.g., 0.55 mm by the dielectric body 3. The conductor 2 is formed of, e.g., a silver-plated soft copper wire, etc. The dielectric body 3 is formed of, e.g., polyethylene, etc. Alternatively, a twisted-pair of conductors 2 each individually covered with the dielectric body 3 may be used in the differential transmission cable 1.

The first shield 4 is formed of, e.g., a metal foil tape made of copper or aluminum, etc. The first shield 4 is not electrically connected to anything and is electromagnetically coupled to the conductors 2.

The insulating layer 5 is formed of, e.g., an insulating material such as polyester tape. The common-mode impedance in the differential transmission cable 1 is controlled by selecting material and thickness, etc., of the insulating layer 5. The thickness of the insulating layer 5 is, e.g., 10 to 30 μm. However, the thickness of the insulating layer 5 may be less than 10 μm or more than 30 μm.

The second shield 6 is formed of, e.g., a conductive material such as braided metal strands. The metal strand used to form the second shield 6 is, e.g., a hard copper wire or a silver-plated soft copper wire, etc., having a strand diameter of 0.05 mm. The second shield 6 prevents external electromagnetic noise from being introduced into the conductors 2, i.e., serves as a so-called "electromagnetic shield".

The jacket 7 is formed of, e.g., an insulating material such as polyvinyl chloride (PVC).

(Method for Connecting Differential Transmission Cable 1)

Next, an example of a method for connecting the differential transmission cable 1 will be described in reference to FIG. 2.

Figure 2:
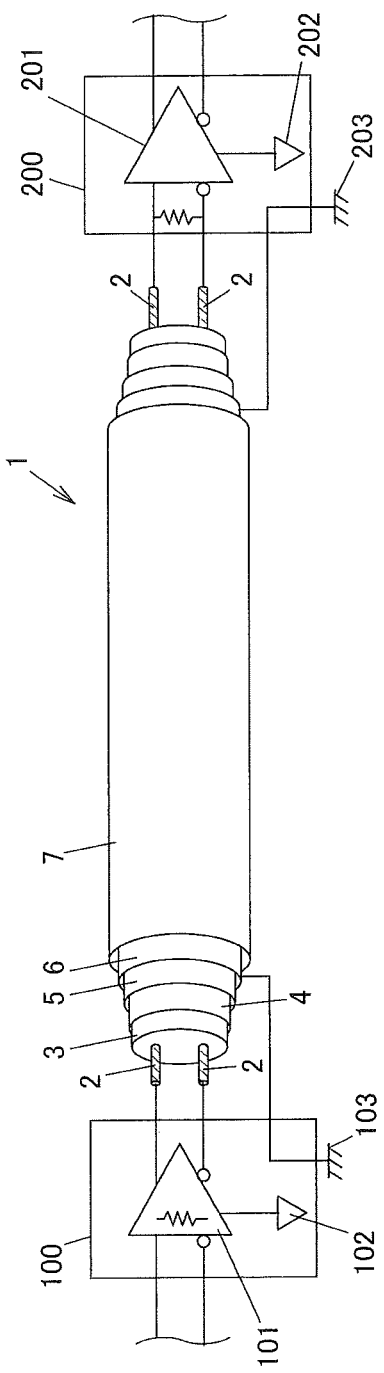
FIG. 2 is a connection diagram illustrating the differential transmission cable in the first embodiment.

FIG. 2 is a connection diagram illustrating the differential transmission cable in the first embodiment. The differential transmission cable 1 is connected to an electric device 100 and an electric device 200 so that the first shield 4 is not electrically connected to anything. Here, the electric devices 100 and 200 are, e.g., a server, a memory unit, a camera, a video equipment or a network equipment, etc.

In detail, the pair of conductors 2 of the differential transmission cable 1 are connected, at one end, to a transceiver 101 of the electric device 100, and the pair of conductors 2 of the differential transmission cable 1 are connected, at the other end, to a receiver 201 of the electric device 200. The transceiver 101 and the receiver 201 here are an example of the first contact point.

The second shield 6 is connected to frame grounds 103 and 203 of the electric devices 100 and 200. The frame grounds 103 and 203 here are an example of the second contact point. Alternatively, the second shield 6 may be connected to signal grounds 102 and 202, etc., via resistors, etc.

(Operation of Differential Transmission Cable 1)

A differential signal is output from the transceiver 101 of the electric device 100 and the differential transmission cable 1 transmits the differential signal output from the electric device 100 to the receiver 201.

Once the differential signal is output from the electric device 100 to the pair of conductors 2 of the differential transmission cable 1, a pair of currents in opposite phases flows as the differential signal through the pair of conductors 2. Although the pair of currents generates a pair of mirror currents in the first shield 4, the pair of mirror currents cancel each other in the first shield 4 due to the opposite phase directions. In addition, even though the first shield 4 is not connected to the frame grounds 103 and 203 or the signal grounds 102 and 202, differential impedance is formed in the differential transmission cable 1 due to electromagnetic coupling between the pair of conductors 2 and the first shield 4.

In addition, once the differential signal is output from the electric device 100 to the pair of conductors 2 of the differential transmission cable 1, the output differential signal is partially mode-converted into a common-mode signal due to, e.g., a difference in the distance between the pair of conductors 2 transmitting the differential signal or non-uniform effective dielectric constant of the dielectric body 3.

Despite the presence of the mode-converted common-mode signal, mirror currents based on the common-mode signal are not generated in the first shield 4 since the first shield 4 is not electrically connected to anything. Therefore, mirror currents based on the common-mode signal are generated only in the second shield 6. Then, the common-mode impedance in the differential transmission cable 1 is formed due to electromagnetic coupling between the pair of conductors 2 and the second shield 6.

The common-mode impedance in the differential transmission cable 1 increases with an increase in a thickness of the insulating layer 5 which is provided between the second shield 6 and the first shield 4. In other words, when a distance between the pair of conductors 2 and the second shield 6 is increased by thickening the insulating layer 5, capacitance between the pair of conductors 2 and the second shield 6 decreases and the common-mode impedance in the differential transmission cable 1 increases.

When the distance between the pair of conductors 2 and the second shield 6 is increased, the site of mirror current generation based on the common-mode signal is located farther from the pair of conductors 2 and self-impedance of the pair of conductors 2 thus increases. In addition, since a magnetic field generated in the pair of conductors 2 is distributed more to the pair of conductors 2 than to the second shield 6, magnetic coupling between the pair of conductors 2 becomes stronger. The common-mode impedance in the differential transmission cable 1 increases also due to the increase in magnetic coupling between the pair of conductors 2.

The increase in the common-mode impedance in the differential transmission cable 1 causes an increase in transmission loss of the common-mode signal. That is, mode conversion from the differential signal into the common-mode signal is reduced. Since the mode conversion from the differential signal into the common-mode signal is equivalent to a component generating intra-pair skew, intra-pair skew of the differential transmission cable 1 is also reduced with the reduction in mode conversion.

The increase in the common-mode impedance in the differential transmission cable 1 also causes an increase in reflection of the common-mode signal which is input to the differential transmission cable 1. In other words, even when a differential signal with intra-pair skew is input to the differential transmission cable 1 from the electric device 100, the differential transmission cable 1 eliminates the intra-pair skew in the input differential signal which is then output to the electric device 200.

Effects of the First Embodiment

The following effects are obtained in the first embodiment.

(1) By connecting the differential transmission cable 1 to electric devices so that the first shield 4 provided around the outer periphery of the pair of conductors 2 is not electrically connected to anything, it is possible to reduce intra-pair skew of the differential transmission cable 1 without increasing transmission loss of the differential signal.

(2) Since the differential transmission cable 1 does not have a drain wire, the pair of conductors 2 are evenly electromagnetically coupled to the first shield 4 and it is thereby possible to further reduce intra-pair skew.

(3) It is possible to arbitrary control the common-mode impedance in the differential transmission cable 1 by selecting thickness and material of the insulating layer 5 which is provided between the first shield 4 and the second shield 6.

(4) It is possible to arbitrary increase the common-mode impedance of the differential transmission cable 1. Therefore, after removing intra-pair skew from the input differential signal, the differential signal is output.

(5) It is possible to reduce intra-pair skew of the differential transmission cable 1. Therefore, in an electric device as a receiver, high-frequency characteristics of the differential signal are improved and transmission loss of the differential signal thus can be reduced. In addition, the reduction in within-skew allows the differential transmission cable 1 to transmit the differential signal over a longer distance.

(6) Since it is possible to configure the differential transmission cable 1 without a drain wire, it is possible to provide a lighter and thinner differential transmission cable 1. In addition, it is possible to simplify the manufacturing process of the differential transmission cable 1, as compared to a differential transmission cable having a drain wire.

(7) Since it is possible to simplify the manufacturing process of the differential transmission cable 1, physical accuracy of the differential transmission cable 1 such as a distance between the pair of conductors 2 or thickness of the dielectric body 3 is improved and it is thus possible to manufacture high-performance differential transmission cables 1 with less manufacturing variation.

Second Embodiment

Figure 3:
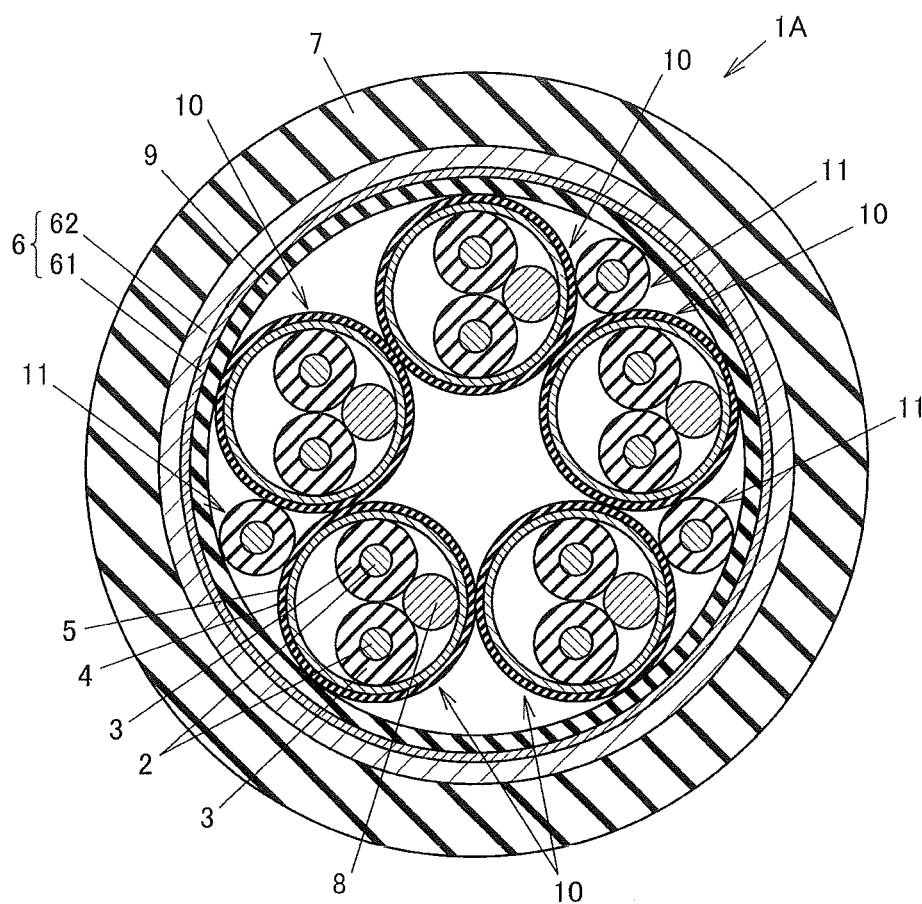
FIG. 3 is a cross sectional view showing a differential transmission cable in a second embodiment of the invention.

FIG. 3 is a cross sectional view showing a differential transmission cable in the second embodiment of the invention. While the differential transmission cable 1 in the first embodiment has a structure using one pair of conductors 2, plural pairs of conductors 2 are used in the structure according to the second embodiment. In addition, in the second embodiment, drain wires 8 are provided so as to be in contact with the first shields 4 and so as not to be electrically connected to anything in the same manner as the first shield 4. The differences from the first embodiment will be mainly described below.

A differential transmission cable 1A in the second embodiment is provided with plural differential transmission lines 10 (five in the second embodiment), in each of which the first shield 4 is wound around a pair of conductors 2 and the drain wire 8 and is not electrically connected to anything and the insulating layer 5 is provided on the outer periphery of the first shield 4, the second shield 6 provided to cover around the outer periphery of the plural twisted differential transmission lines 10 via an insulating layer 9, signal lines 11 provided between the differential transmission lines 10 and the insulating layer 9, and the jacket 7 covering around the outer periphery of these components. The differential transmission cable 1A is used as, e.g., a DisplayPort cable, etc.

The second shield 6 has a metal foil 61 wound around the outer periphery of the insulating layer 9 and braided metal strands 62 formed to further cover the metal foil 61. The second shield 6 may be alternatively configured to have either the metal foil 61 or the metal strands 62. An aluminum foil or a copper foil, etc., is used as the metal foil 61.

(Connection of Differential Transmission Cable)

Figure 4:
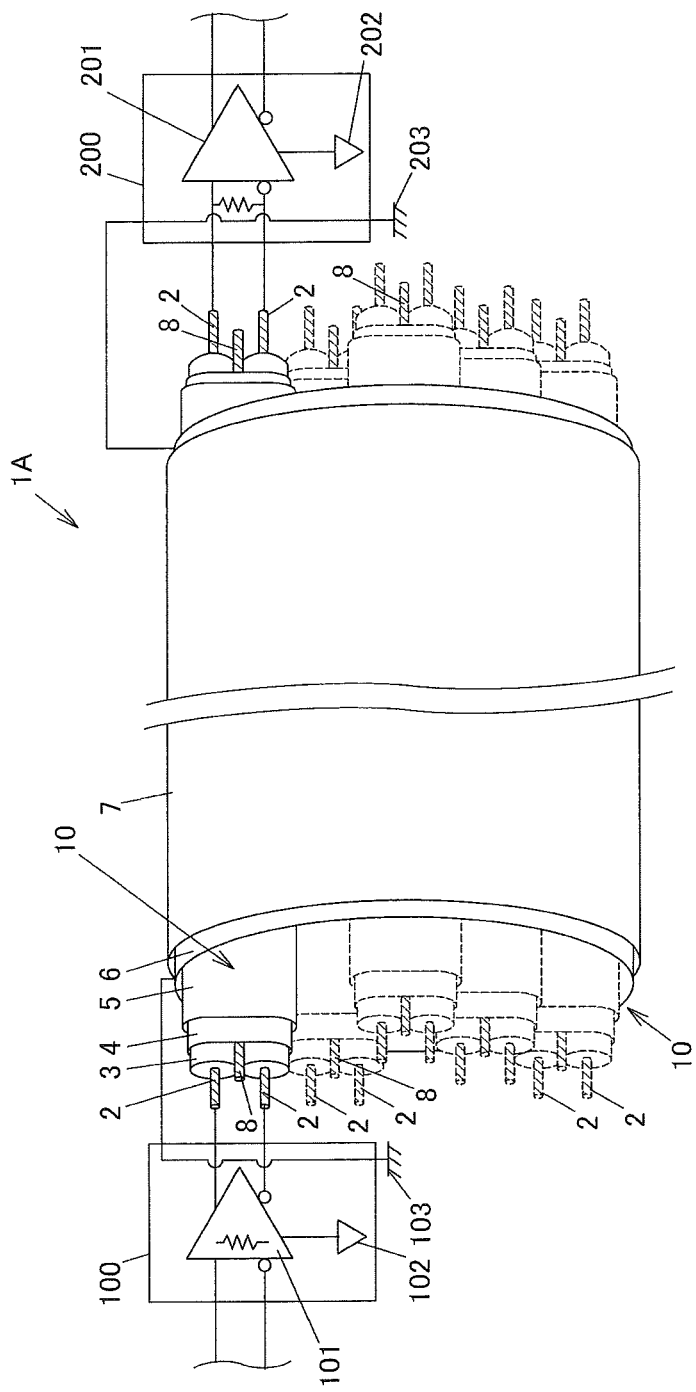
FIG. 4 is a connection diagram illustrating the differential transmission cable in the second embodiment.

FIG. 4 is a connection diagram illustrating the differential transmission cable in the second embodiment. The differential transmission cable 1A connects the electric device 100 to the electric device 200 so that the first shields 4 and the drain wires 8 are not electrically connected to anything. In FIG. 4, a pair of conductors 2 in one of the differential transmission lines 10 are connected to the electric devices 100 and 200. In addition, illustrations of the signal lines 11 and the insulating layer 9 are omitted in FIG. 4.

The pairs of conductors 2 of the plural differential transmission lines 10 are connected to the transceivers 101 and the receivers 201 of the electric devices 100 and 200 which correspond to the respective differential transmission lines 10. The second shield 6 is connected to the frame grounds 103 and 203 of the electric devices 100 and 200. Alternatively, the second shield 6 may be connected to the signal grounds 102 and 202 via resistors, etc.

Effects of the Second Embodiment

According to the second embodiment, it is possible to easily reduce intra-pair skew in the differential signal by changing the method for connecting the differential transmission cable.

Third Embodiment

Figure 5:
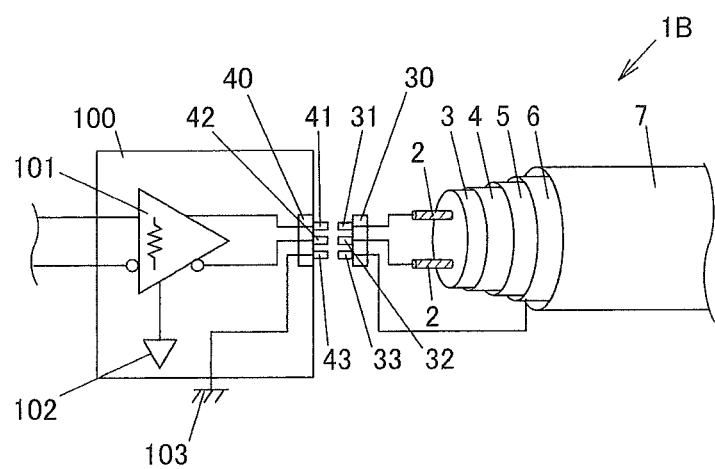
FIG. 5 is a connection diagram illustrating a differential transmission cable in a third embodiment of the invention.

FIG. 5 is a connection diagram illustrating a differential transmission cable in the third embodiment of the invention. While the differential transmission cable 1 in the first embodiment is directly connected to the electric device 100, the cable is connected to the electric device 100 via connectors 30 and 40 in the third embodiment. The differences from the first embodiment will be mainly described below. FIG. 5 shows only one end portion of a differential transmission cable 1B.

In the connectorized differential transmission cable 1B of the third embodiment, the connector 30 is provided on at least one end portion. The connector 30 is provided with terminals 31 and 32 to be connected to the pair of conductors 2 and a terminal 33 to be connected to the second shield 6.

The connector 40 provided on the electric device 100 is provided with terminals 41 and 42 to be connected to the terminals 31 and 32 to transmit a differential signal output from the transceiver 101 and a terminal 43 to be connected to the terminal 33 to connect the second shield 6 to the frame ground 103, and is fitted to the connector 30 of the connectorized differential transmission cable 1B. Here, the terminals 31 and 32 are an example of a signal terminal, and the terminal 33 is an example of a ground terminal. Alternatively, the terminal 43 may be connected to the signal ground 102, etc., via a resistor, etc.

Effects of the Third Embodiment

According to the third embodiment, a connection method to reduce intra-pair skew can be easily applied to connection between electric devices by providing the connector 30 on at least one end portion of the differential transmission cable 1B.

Example 1

The differential transmission cable 1 in Example 1 will be described below in comparison to a differential transmission cable 1a in Comparative Example 1. In Example 1 which corresponds to the first embodiment, the insulating layer 5 of the differential transmission cable 1 was formed of polyester so as to have a thickness of 18 μm.

Comparative Example 1

Figure 6:
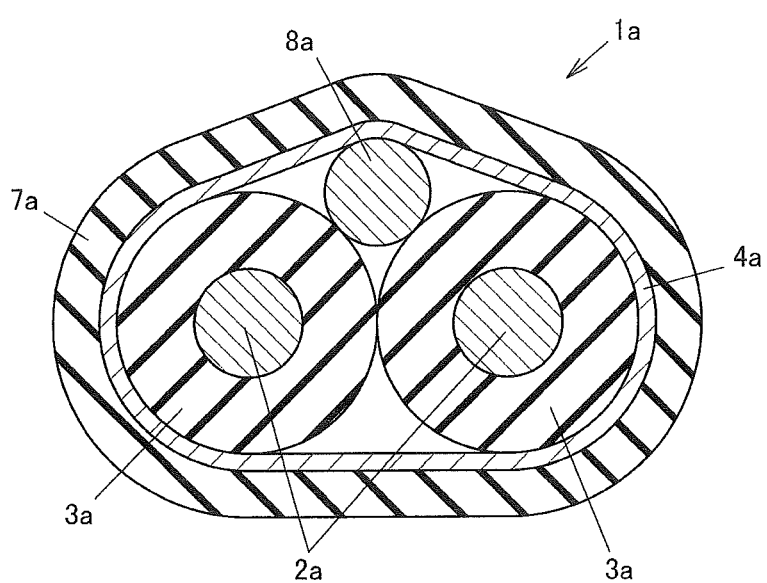
FIG. 6 is a cross sectional view showing a differential transmission cable in Comparative Example 1.

FIG. 6 is a cross sectional view showing the differential transmission cable in Comparative Example 1. The differential transmission cable 1a in Comparative Example 1 is provided with a pair of conductors 2a, dielectric bodies 3a covering the outer peripheries of the pair of conductors 2a, a drain wire 8a, a shield 4a provided on the outer periphery of the dielectric bodies 3a so as to be in contact with the drain wire 8a, and a jacket 7a covering around the outer periphery of these components.

The pair of conductors 2a of the differential transmission cable 1a in Comparative Example 1 are connected, at one end, to the transceiver 101 of the electric device 100 and are connected, at the other end, to the receiver 201 of the electric device 200. The drain wire 8a is connected to the shield 4a. The shield 4a is connected, at one end, to the signal ground 102 or the frame ground 103 of the electric device 100 and is connected, at the other end, to the signal ground 202 or the frame ground 203 of the electric device 200.

The differential transmission cable 1 in Example 1 and the differential transmission cable 1a in Comparative Example 1 were evaluated for the following characteristics. Differential impedance and common-mode impedance were measured using a TDR (Time Domain Reflectometry) technique. Then, a step pulse obtained by the TDR technique was input to the differential transmission cables and intra-pair skew was measured based on a waveform passing through the differential transmission cables. Mode conversion and transmission loss of differential signal were measured by a network analyzer.

(Evaluation of Differential Impedance)

Figure 7:
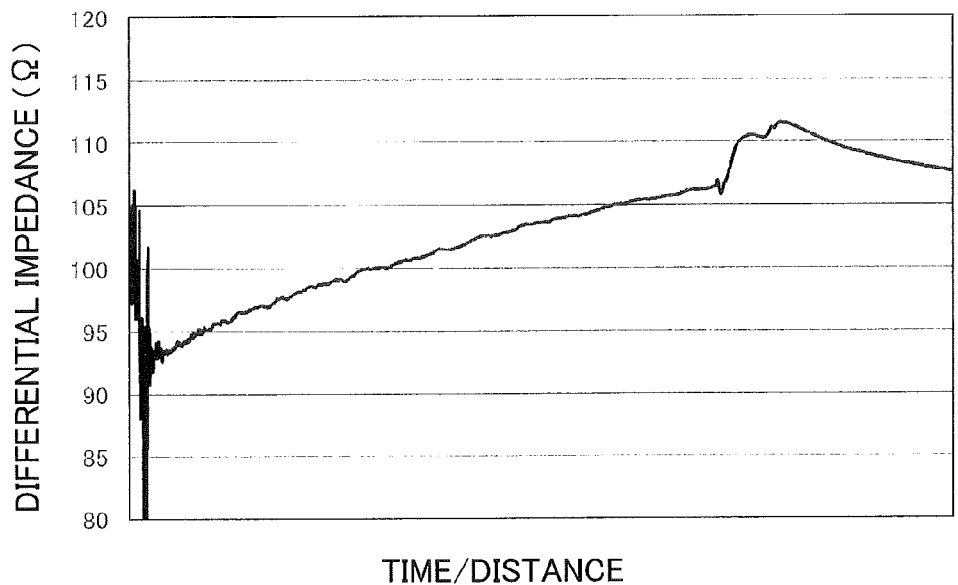
FIG. 7 is a characteristic diagram illustrating differential impedance in a differential transmission cable in Example 1.
Figure 8:
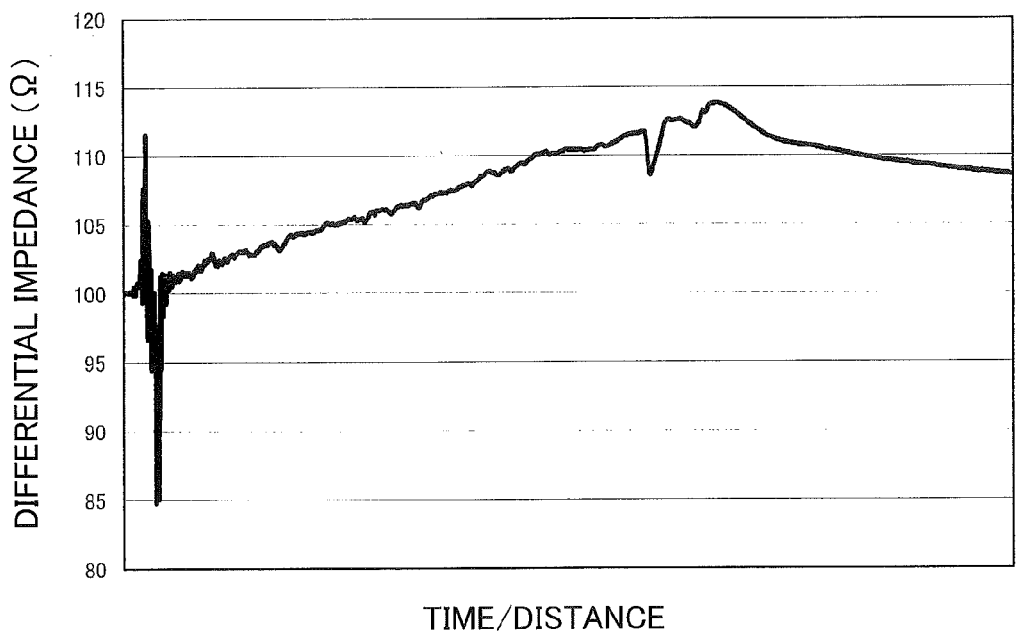
FIG. 8 is a characteristic diagram illustrating differential impedance in the differential transmission cable in Comparative Example 1.

FIG. 7 is a characteristic diagram illustrating differential impedance in the differential transmission cable in Example 1 and FIG. 8 is a characteristic diagram illustrating differential impedance in the differential transmission cable in Comparative Example 1. In a general specification of differential transmission cable, it is assumed that differential impedance varies about 10% due to manufacturing variation in differential transmission cables. FIGS. 7 and 8 show that a difference in differential impedance between the differential transmission cable 1 in Example 1 and the differential transmission cable 1a in Comparative Example 1 falls within a range of the manufacturing variation.

(Evaluation of Common-Mode Impedance)

Figure 9:
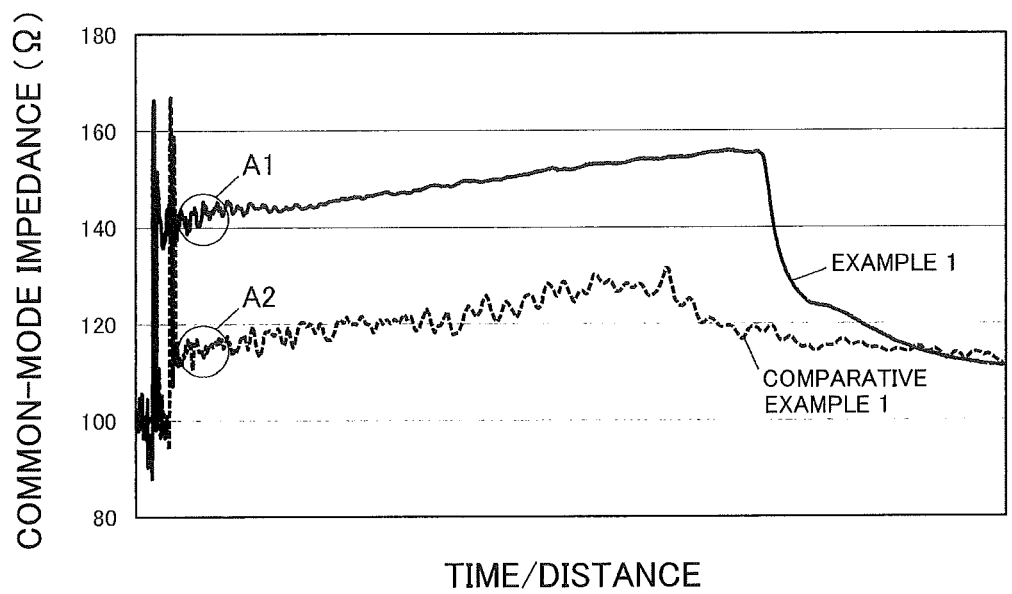
FIG. 9 is a characteristic diagram illustrating common-mode impedance in the differential transmission cables in Example 1 and Comparative Example 1.

FIG. 9 is a characteristic diagram illustrating common-mode impedance in the differential transmission cables in Example 1 and Comparative Example 1. The common-mode impedance value is the value appeared just after the rise of the impedance waveform. As indicated by A1 in FIG. 9, the common-mode impedance value of the differential transmission cable 1 in Example 1 is about 140Ω. Meanwhile, as indicated by A2 in FIG. 9, the common-mode impedance value of the differential transmission cable 1a in Comparative Example 1 is about 110Ω. It was thus confirmed that the common-mode impedance in Example 1 shows an increase as compared with Comparative Example 1.

(Evaluation of Transmission Loss of Differential Signal and Transmission Loss of Common-Mode Signal)

Figure 10:
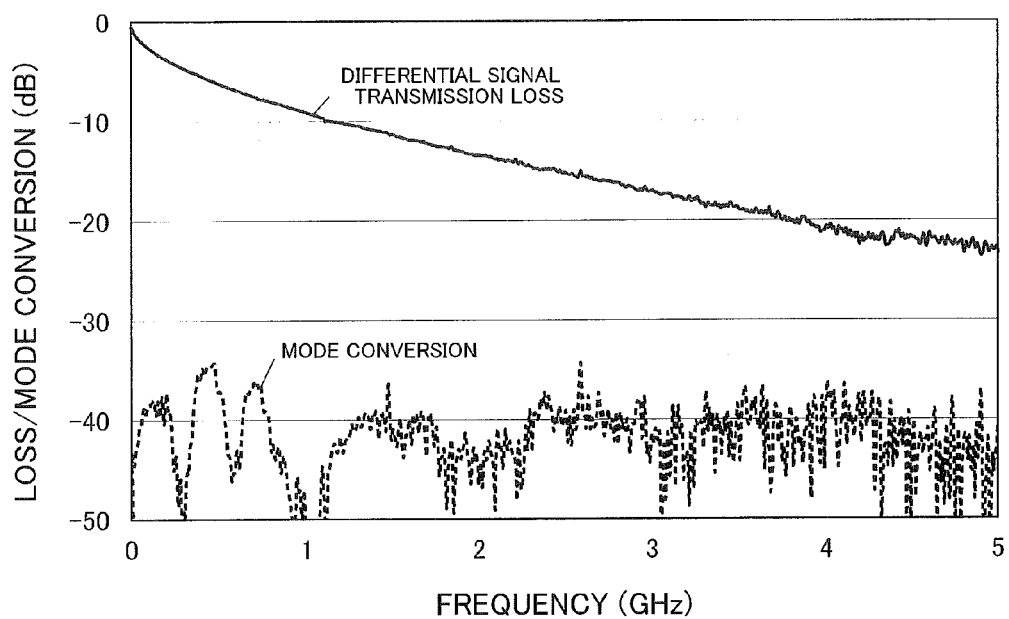
FIG. 10 is a characteristic diagram illustrating transmission loss of differential signal and mode conversion from differential signal into common-mode signal in the differential transmission cable in Example 1.
Figure 11:
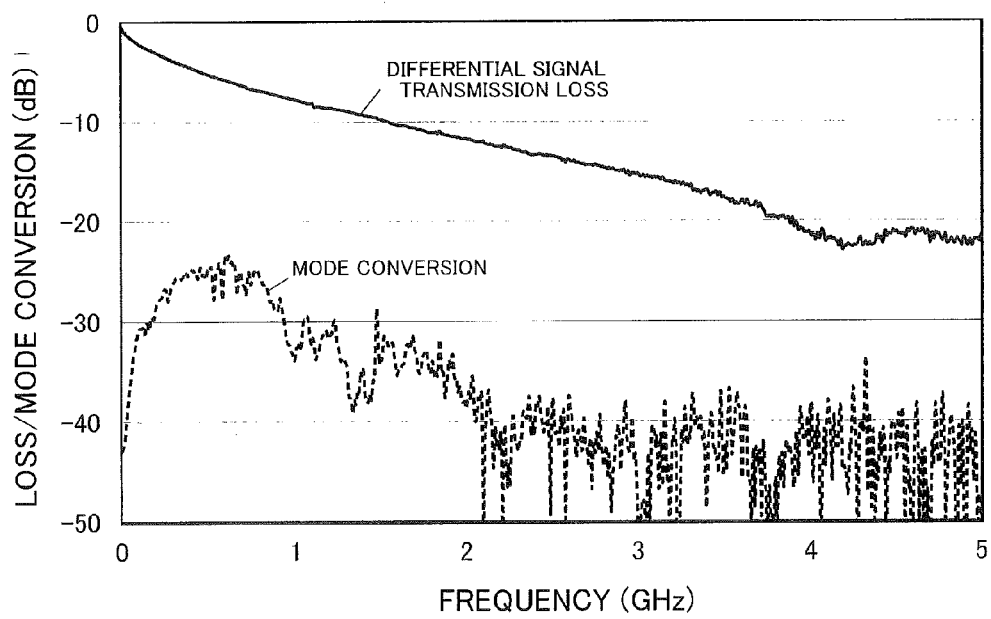
FIG. 11 is a characteristic diagram illustrating transmission loss of differential signal and mode conversion from differential signal into common-mode signal in the differential transmission cable in Comparative Example 1.
Figure 12:
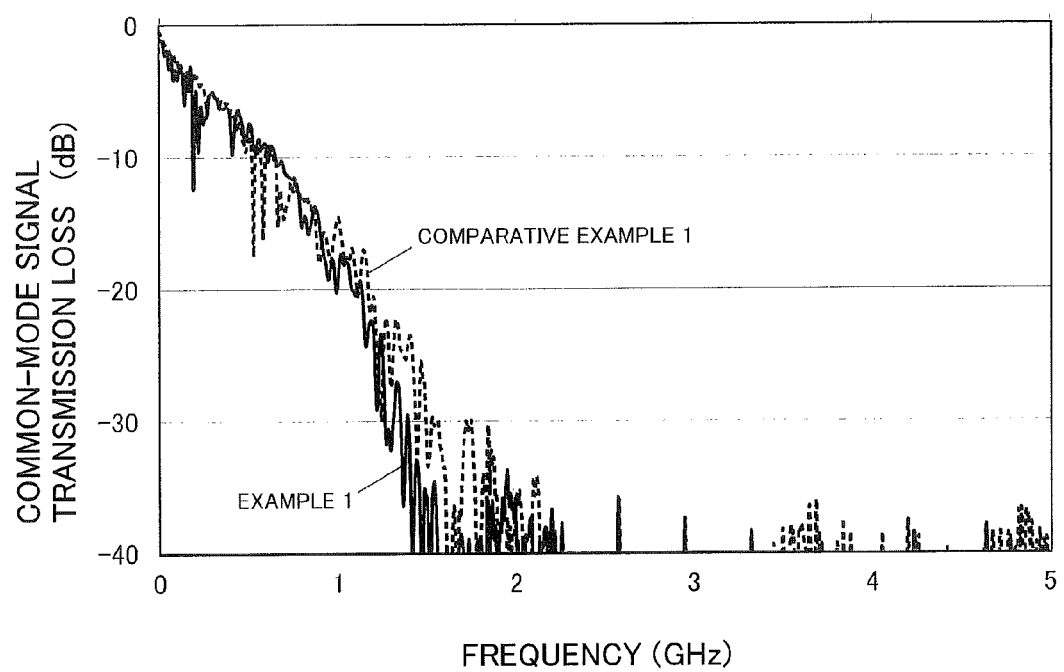
FIG. 12 is a characteristic diagram illustrating transmission loss of common-mode signal in the differential transmission cables in Example 1 and Comparative Example 1.

FIG. 10 is a characteristic diagram illustrating transmission loss of differential signal and mode conversion from differential signal into common-mode signal in the differential transmission cable in Example 1 and FIG. 11 is a characteristic diagram illustrating transmission loss of differential signal and mode conversion from differential signal into common-mode signal in the differential transmission cable in Comparative Example 1. FIG. 12 is a characteristic diagram illustrating transmission loss of common-mode signal in the differential transmission cables in Example 1 and Comparative Example 1.

As understood from the values of transmission loss of differential signal shown in FIGS. 10 and 11, the transmission loss of differential signal transmitted through the differential transmission cable 1 in Example 1 and that of the differential transmission cable 1a in Comparative Example 1 are not much different in a range of 0 to 5 GHz shown in the drawings. It was thus confirmed that the transmission loss of differential signal does not increase in the differential transmission cable 1 in Example 1.

FIG. 12 shows that the absolute value of transmission loss of common-mode signal in a range of 0 to 2 GHz is larger in the differential transmission cable 1 in Example 1 than in the differential transmission cable 1a in Comparative Example 1 and it was thus confirmed that the transmission loss of common-mode signal transmitted through the differential transmission cable 1 in Example 1 shows an increase as compared to the differential transmission cable 1a in Comparative Example 1.

(Evaluation of Mode Conversion from Differential Signal into Common-Mode Signal)

As understood from the amount of mode conversion from differential signal into common-mode signal shown in FIGS. 10 and 11, the absolute value indicating mode conversion, especially in a differential signal frequency range of 0 to 2 GHz, is larger in the differential transmission cable 1 in Example 1 than in the differential transmission cable 1a in Comparative Example 1. That is, it was confirmed that the mode conversion in Example 1 is reduced as compared to Comparative Example 1.

An increase in the absolute value of mode conversion in the differential transmission cable 1 in Example 1 is not seen in the differential signal frequency range of not less than 2 GHz. This is because transmission loss of common-mode signal transmitted through the differential transmission cables 1 and 1a increases in the range of not less than 2 GHz, as shown in FIG. 12. It is therefore anticipated that the amount of mode conversion decreases also in the range of not less than 2 GHz.

(Evaluation of Intra-Pair Skew)

Table 1 shows the actual measured values of intra-pair skew of the differential transmission cables in Example 1 and Comparative Example and the reduced values. Since the actual measured values and the reduced values in Table 1 include an error of 5 ps due to a measuring instrument used to measure intra-pair skew, it is anticipated that the true values are smaller than the values shown in Table 1.

TABLE 1

|  | Example 1 | Comparative Example 1 |
|---|---|---|
| Intra-pair skew: Actual measured value | 7.6 ps/5.5 m | 50 ps/5.5 m |
| Intra-pair skew: Reduced value | 1.4 ps/m | 9.1 ps/m |
| Reduced rate of Intra-pair skew | 84.8% | Reference value |

It was confirmed from Table 1 that the actual measured value of intra-pair skew and the reduced value in the differential transmission cable 1 in Example 1 were reduced by 84.8% as compared to the differential transmission cable 1a in Comparative Example 1 when the value in Comparative Example 1 was used as a reference.

(Evaluation of Intra-Pair Skew in Output Signal Relative to Input Signal)

A differential signal with intra-pair skew was input to the differential transmission cables 1 and 1a (a cable length of 1.0 m) in Example 1 and Comparative Example 1, and the level of intra-pair skew in the output signal relative to that in the input differential signal was measured. Table 2 shows the levels of intra-pair skew in the differential signals input into the differential transmission cables in Example 1 and Comparative Example 1 and also shows the actual measured values of intra-pair skew in the output differential signals relative to the input differential signals.

TABLE 2

|  | (Unit: ps) | |
|---|---|---|
| Intra-pair skew in | Intra-pair skew in Output signal | |
| Input signal | Example 1 | Comparative Example 1 |
| 0 | −9 | 7 |
| −29 | −9 | 11 |
| −95 | −6 | 33 |
| −159 | −8 | 91 |

As understood from Table 2, the level of intra-pair skew in the output signal of the differential transmission cable 1a in Comparative Example 1 increased from 7 to 91 ps with an increase in intra-pair skew in the input signal, while the level of intra-pair skew in the output signal of the differential transmission cable 1 in Example 1 was substantially constant even when intra-pair skew in the input signal was increased. It was thus confirmed that the differential transmission cable 1 in Example 1 removes intra-pair skew from the input signal and then outputs the differential signal.

Example 2

A differential transmission cable in Example 2 will be described below in comparison to a differential transmission cable in Comparative Example 2. Both the differential transmission cable in Example 2 and the differential transmission cable in Comparative Example 2 correspond to the differential transmission cable 1A in the second embodiment and the connection method applied to the differential transmission cable 1A was different in Example 2 and in Comparative Example 2.

Table 3 shows a difference in the connection method between Example 2 and Comparative Example 2. In Example 2 and Comparative Example 2, the insulating layers 5 and 9 of the differential transmission cable 1A were formed of polyester so as to be respectively have thicknesses of 18 μm and 24 μm.

TABLE 3

| Method for connecting Shield | Connection between First shield and Ground | Connection between Second shield and Ground |
|---|---|---|
| Example 2 | Not connected | Connected |
| Comparative Example 2 | Connected | Connected |

As shown in Table 3, the difference between Example 2 and Comparative Example 2 is whether or not the first shield is connected to the ground. Likewise, between Example 2 and Comparative Example 2, there is a difference in whether or not the drain wire 8 is connected to the ground.

(Evaluation of Common-Mode Impedance)

Figure 13:
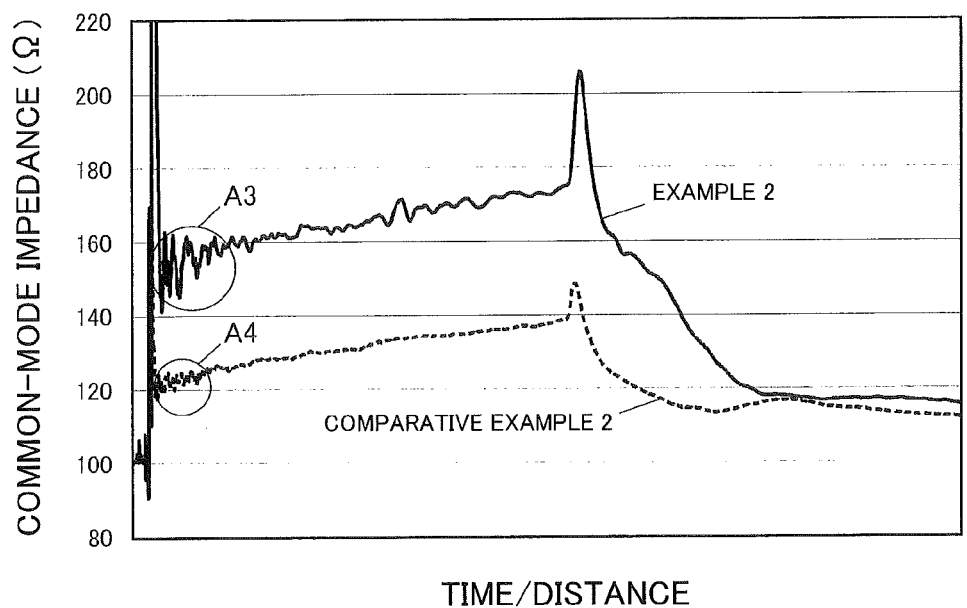
FIG. 13 is a characteristic diagram illustrating common-mode impedance in differential transmission cables in Example 2 and Comparative Example 2.

FIG. 13 is a characteristic diagram illustrating common-mode impedance in the differential transmission cables in Example 2 and Comparative Example 2. As indicated by A3 in FIG. 13, the common-mode impedance in the differential transmission cable 1A in Example 2 is about 155Ω. Meanwhile, as indicated by A4 in FIG. 13, the common-mode impedance in the differential transmission cable 1A in Comparative Example 2 is about 120Ω. It was thus confirmed that the common-mode impedance in Example 2 shows an increase as compared with Comparative Example 2.

(Evaluation of Transmission Loss of Differential Signal)

Figure 14:
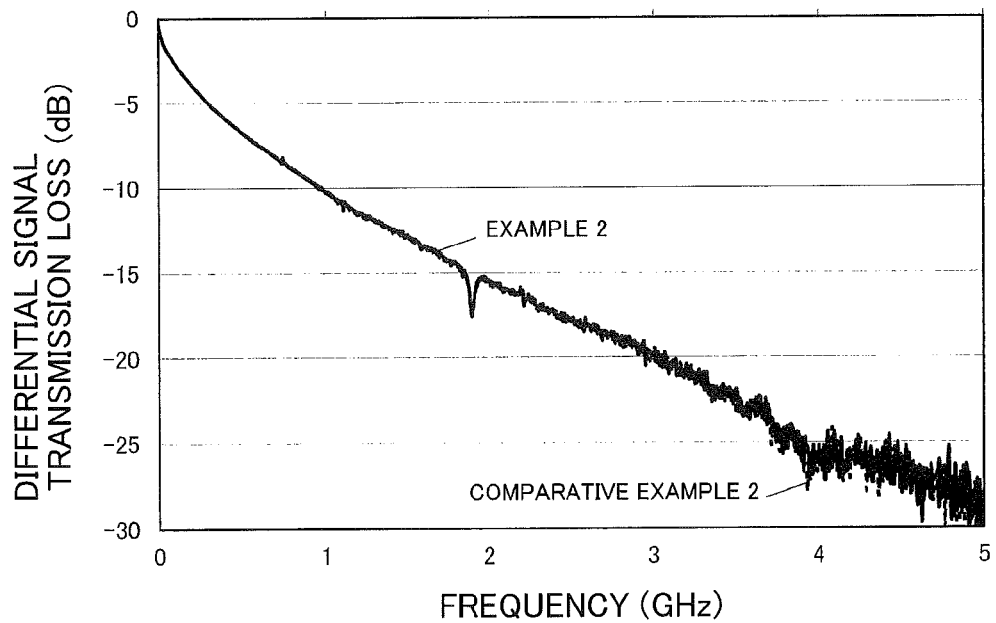
FIG. 14 is a characteristic diagram illustrating transmission loss of differential signal in the differential transmission cables in Example 2 and Comparative Example 2.

FIG. 14 is a characteristic diagram illustrating transmission loss of differential signal in the differential transmission cables in Example 2 and Comparative Example 2. Since the transmission loss of differential signal transmitted through the differential transmission cables in Example 2 and that in Comparative Example 2 are not much different in a range of 0 to 5 GHz shown in the drawing, it was confirmed from FIG. 14 that the transmission loss of differential signal does not increase in Example 2, neither.

(Evaluation of Mode Conversion from Differential Signal into Common-Mode Signal)

Figure 15:
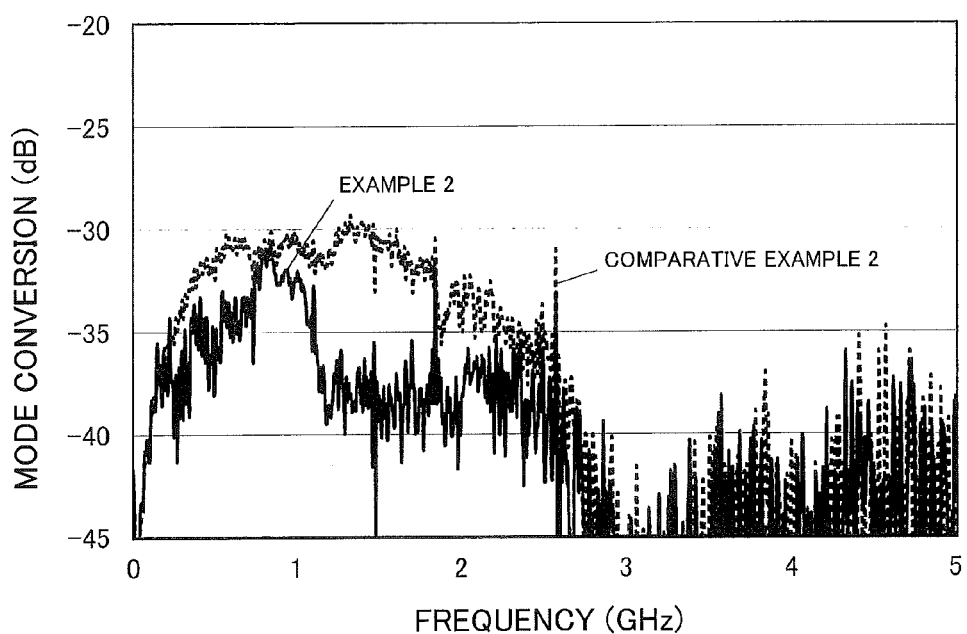
FIG. 15 is a characteristic diagram illustrating mode conversion in the differential transmission cables in Example 2 and Comparative Example 2.

FIG. 15 is a characteristic diagram illustrating mode conversion in the differential transmission cables in Example 2 and Comparative Example 2. It was confirmed from FIG. 15 that the absolute value of mode conversion, especially in a range of 0 to 2.5 GHz, is larger in Example 2 than in Comparative Example 2.

(Evaluation of Intra-Pair Skew)

Table 4 shows the actual measured values of intra-pair skew of the differential transmission cables in Example 2 and Comparative Example 2 and the reduced values.

TABLE 4

|  | Example 2 | Comparative Example 2 |
|---|---|---|
| Intra-pair skew: Actual measured value | 7.6 ps/6 m | 16 ps/6 m |
| Intra-pair skew: Reduced value | 1.27 ps/m | 2.67 ps/m |
| Reduced rate of intra-pair skew | 53.7% | Reference value |

It was confirmed from Table 4 that the actual measured value of intra-pair skew and the reduced value in Example 2 were reduced by 53.7% as compared to Comparative Example 2 when the value in Comparative Example 2 was used as a reference.

[Modifications]

Embodiments of the invention are not limited to the embodiments described above, and the various kinds of modifications can be implemented without departing from the gist of the invention. For example, the configuration may be such that plural pairs of conductors 2 are arranged at equal intervals using the dielectric body 3 and the outer periphery thereof is covered with the first and second shields 4 and 6.

In addition, some of the constituent elements in the above-mentioned embodiments can be omitted without changing the gist of the invention. For example, the differential transmission cable 1A in the second embodiment may be configured to not have the drain wires 8, the signal lines 11 and one of the insulating layer 5 and the insulating layer 9.

REFERENCE SIGNS LIST 1, 1a, 1A, 1B differential transmission cable
2, 2a conductor
3, 3a dielectric body
4 first shield
4a shield
5, 9 insulating layer 6 second shield
7, 7a jacket
8, 8a drain wire
10 differential transmission line
11 signal line
30 connector
31, 32, 33 terminal
40 connector
41, 42, 43 terminal
61 metal foil
62 metal strand
100 electric device
101 transceiver
102 signal ground
103 frame ground
200 electric device
201 receiver
202 signal ground
203 frame ground

The invention claimed is:

1. A method for connecting a differential transmission cable, comprising:
   connecting a pair of conductors for transmitting a differential signal to a first contact point; and
   connecting a second shield, provided on a periphery of a first shield via an insulating layer, to a second contact point in a state that the first shield provided on a periphery of the pair of conductors via a dielectric layer is not electrically connected to anywhere.

2. The differential transmission cable of claim 1, wherein the first contact point comprises one of a transceiver and a receiver of an electric device.

3. The method of claim 1 wherein the second contact point comprises frame ground of an electric device.

4. A method for connecting a differential transmission cable, comprising:
   connecting a pair of conductors for transmitting a differential signal to a first contact point; and
   connecting a second shield, provided on a periphery of a first shield via an insulating layer, to second contact points in a state that the first shield provided on the periphery of the pair of conductors via a dielectric layer and a drain wire in contact with the first shield are not electrically connected to anywhere.

5. A differential transmission cable, comprising:
   a pair of conductors for transmitting a differential signal;
   a first shield that is provided on a periphery of the pair of conductors via a dielectric layer and is not electrically connected to anywhere; and
   a second shield provided on a periphery of the first shield via an insulating layer, wherein common-mode impedance is controlled by selecting a material or a thickness of the insulating layer provided between the first shield and the second shield.

6. An electric device, comprising the differential transmission cable according to claim 5.

7. The differential transmission cable of claim 5, wherein the first shield comprises metal foil tape which is wound around the dielectric layer and electromagnetically coupled to the pair of conductors.

8. The differential transmission cable of claim 7, wherein the metal foil tape comprises one of copper and aluminum.

9. The differential transmission cable of claim 5, wherein a thickness of the insulating later is in the range from 10 μm to 30 μm.

10. The differential transmission cable of claim 5, wherein the insulating layer comprises polyester tape.

11. The differential transmission cable of claim 5, wherein the second shield comprises braided metal strands, a strand of the braided metal strands comprising one of hard copper wire and silver-plated soft copper wire.

12. The differential transmission cable of claim 5, further comprising:
   a jacket comprising an insulating material and formed around an outer periphery of the outer shield.

13. The differential transmission cable of claim 5, wherein the dielectric layer comprises a substantially circular cross-section.

14. The differential transmission cable of claim 5, wherein the first shield comprises a circular cylindrical shape, and the insulating layer contacts a surface of the first shield around an entire periphery of the first shield.

15. A differential transmission cable, comprising:
   a cable main body comprising a pair of conductors for transmitting a differential signal, a first shield provided on a periphery of the pair of conductors via a dielectric layer, and a second shield provided on a periphery of the first shield via an insulating layer; and
   a connector that comprises a signal terminal connected to the pair of conductors and a ground terminal connected to the second shield, and that is provided on at least one end portion of the cable main body such that the first shield is not electrically connected to anywhere.

16. An electric device, comprising the differential transmission cable according to claim 15.

17. A differential transmission cable, comprising:
   a cable main body comprising a pair of conductors for transmitting a differential signal, a first shield provided on a periphery of the pair of conductors via a dielectric layer, a drain wire in contact with the first shield, and a second shield provided on a periphery of the first shield via an insulating layer; and
   a connector that comprises a signal terminal connected to the pair of conductors and a ground terminal connected to the second shield, and that is provided on at least one end portion of the cable main body such that the first shield and the drain wire are not electrically connected to anywhere.

18. An electric device, comprising the differential transmission cable according to claim 17.

* * * * *